March 21, 1933.  W. A. GUNNING  1,902,401
OPHTHALMOLOGICAL APPARATUS
Filed Nov. 14, 1929  2 Sheets-Sheet 1
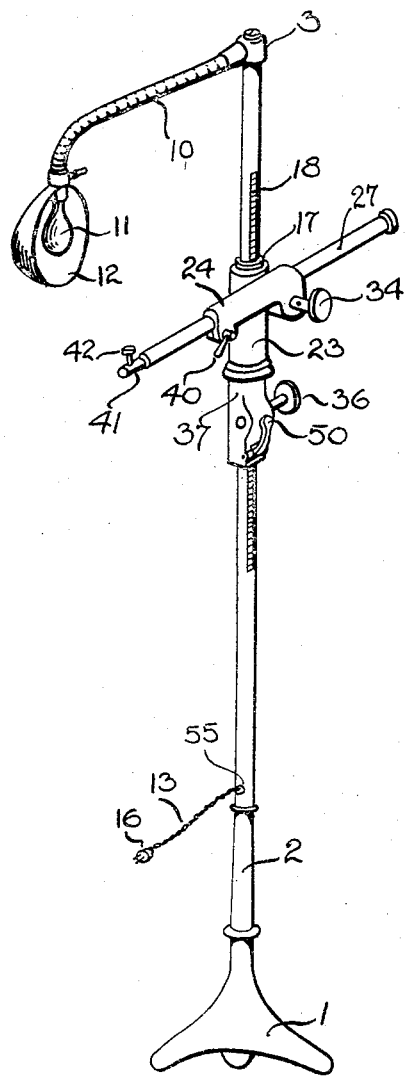
FIG. I
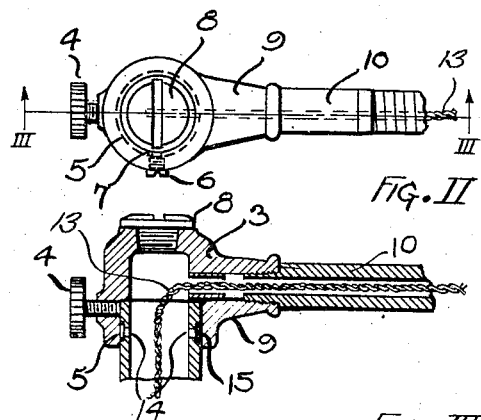
FIG. II
FIG. III
WILLIAM A. GUNNING
INVENTOR
BY Harry H. Styll.
ATTORNEY

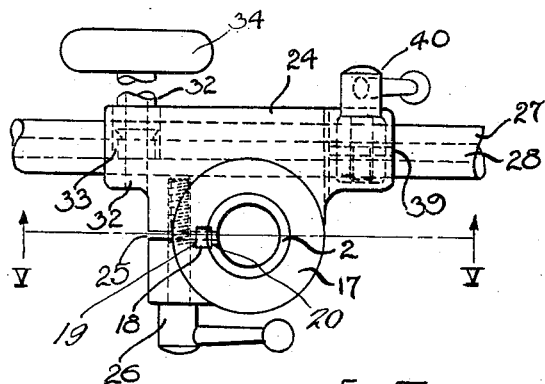
FIG. IV
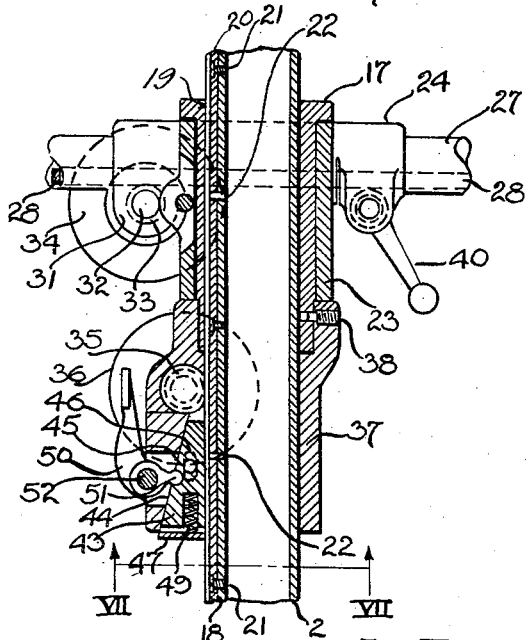
FIG. V
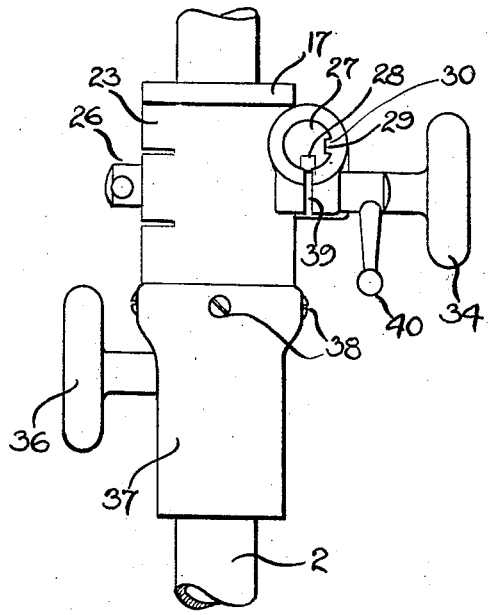
FIG. VI
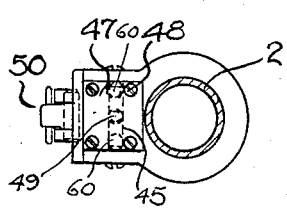
FIG. VII

Patented Mar. 21, 1933

1,902,401

UNITED STATES PATENT OFFICE

WILLIAM A. GUNNING, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMOLOGICAL APPARATUS

Application filed November 14, 1929. Serial No. 407,143.

This invention relates to improvements in ophthalmological apparatus and has particular reference to a stand for diagnostic instruments and the like.

The principal object of this invention is to provide a construction for a diagnostic instrument stand such as will embody the utmost simplicity and yet be completely adjustable for the various positions into which the instruments are placed.

Another important object is to provide easily accessible means for adjusting the stand to any desired position.

Another object is to combine and coordinate the moving parts so that the operator will quickly become familiar therewith and lose no time in adjusting the instrument to the patient's requirements.

Another object of the invention is to provide a stand of great stability and rigid enough at its extremities to prevent quivering or other undesired motion in the instruments used thereon.

Other objects and advantages will become apparent from the following description taken in connection with the accompanying drawings and it will be apparent that many changes may be made in the details of construction and arrangement of parts without departing from the spirit of the invention as expressed in the accompanying claims. I, therefore, do not wish to be limited to the exact details shown and described as the preferred forms only have been shown by way of illustration.

In the drawings:

Fig. I is a perspective view of the complete apparatus.

Fig. II is a top or plan view of the illuminating arm assembly.

Fig. III is a section on line III—III of Fig. II.

Fig. IV is top or plan view of the main adjusting and clamping means.

Fig. V is a section on line V—V of Fig. IV.

Fig. VI is a side view of the main adjusting and clamping means.

Fig. VII is a section taken on line VII—VII of Fig. V.

During the course of a thorough examination of a patient's eyes it is necessary to use several types of instruments in succession. These instruments are of varying shapes and sizes but all require accurate adjustment before the patient's eyes in order that a correct examination may be made. It will be apparent that if much time is spent on adjusting the instruments satisfactorily before the patient's eyes as has heretofore been unavoidable, the total length of time spent on the examination is likely to be excessive from the point of view of the patient's comfort and the operator's daily quota of examinations. Another bad feature of the prior instrument stands which were difficult to adjust was the fact that the adjustment finally achieved was likely to be inaccurate due to the pardonable haste of the operator in endeavoring to avoid overtiring his patient and it will readily be seen that a device which eliminates this drawback will be of great value to the busy practitioner.

It is the prime object of my invention, therefore, to provide a device upon which various diagnostic instruments may be quickly interchanged and moved into position for accurate adjustment before the patient's eyes without the tedious and expensive loss of time which has heretofore been unavoidable. In the accomplishment of the foregoing advantages I have also devised means by which the instruments will be maintained rigidly in the desired position as will be consistent with the high degree of precision demanded by modern practitioners.

Referring to the drawings wherein similar characters of reference denote corresponding parts throughout the several views the base 1 carries a standard 2 which is preferably of tubular construction and is provided with a surmounting cap 3 fitting closely thereover and locked in position by the set screw 4. Below the set-screw 4 I preferably form a groove 5 around the tubular standard 2 into which a retaining screw 6 threadedly engaging the cap 3 is reduced at its end 7 to enter. In this way I provide means whereby the cap may be rotated by loosening screw 4 without fear of it being pulled completely off the standard 2 because of the retaining screw 6 locating in the groove 5.

In order that the cap will not be rotated several times in one direction I have provided simple means to restrict the rotation to a half circle. This is accomplished by forming two small holes 14 in the groove 5 and inserting therein headed pins 15 spaced substantially opposite each other in the groove 5. The retaining screw end 7 will abut these pins 15 when the cap 3 is rotated and so be prevented from spinning around completely.

At the upper end of the cap 3 is a threaded plug 8 which may be removed should other fittings be desired. The cap 3 may also be removed should other illuminating means be preferred.

Protruding from one side of the cap 3 is a nose 9 into which is threadedly engaged a flexible arm 10 carrying at the other end a lamp 11 and shade 12. The lamp 11 may be adjusted to any desired position by the free rotation of cap 3 around the standard 2 and the flexing of the arm 10 as is usual with the ordinary "goose neck" electrical fitting. Electrical contact with the lamp 11 is obtained by means of wires 13 which enter the standard 2 near the base by means of an orifice 55 and extend through the arm 10 to the lamp. The plug 16 may be connected to a suitable source of current.

Mounted around the standard 2 intermediate the base 1 and cap 3 is a sleeve 17 which is adapted to be moved up and down on the standard 2 and prevented from rotating by means of the rack 18 which locates in a longitudinal slot 19 in the sleeve 17. The rack 18 also fits in a longitudinal slot 20 in the standard 2 wherein it is held by a number of small screws 21 and dowels 22.

Surrounding the sleeve 17 is a tubular member or housing 23 having an offset portion 24 with a bore substantially normal to the standard 2. A split portion 25 on the tubular member is adapted to be closed together by means of the locking bolt 26 to clamp the tubular member or housing 23 on the sleeve 17. In the bore of the offset portion 24 is a rod 27 provided with a rack 28 which locates in a related slot in the rod 27. The rod 27 is prevented from rotating by a slot 29 in its surface into which a key 30 in the bore of the offset portion 24 fits.

In order to move the rod 27 a depending portion 31 in the offset portion 24 is provided with a spindle 32 on which is mounted a pinion 33 cut to a similar pitch as the rack 28 with which it meshes. A handle 34 is provided to allow convenient operation of the pinion 33.

To move the sleeve 17 a second pinion 35 is provided which meshes with the rack 18 and is operated by handle 36. The pinion 35 is not directly on the sleeve 17 as will be seen from Fig. V, but is located in a second sleeve 37 which surrounds the lower portion of the first sleeve 17 and is attached thereto by means of the screws 38 which extend through the upper portion of the sleeve 37 and the lower portion of the sleeve 17 to rigidly unite the sleeve members and cause them to function as a single sleeve. Similarly to the sleeve 17 this second sleeve 37 is prevented from turning by the rack 18 locating in a slot in its bore, but is free to move longitudinally on the shaft or standard 2. It will readily be seen that the outer tubular member 23 with its offset portion 24 is freely rotatable on the inner sleeve 17 supported by the lower sleeve 37, and that said outer tubular member 23 is also movable longitudinally with its offset portion 24 by means of the rack 18 and pinion 35. The rod 27 in the said offset portion is also movable longitudinally by means of the other rack 28 and pinion 33.

In order to lock the rod 27 in any desired position I have provided a split portion 39 on the offset portion 24 which is adapted to be closed together around the rod 27 by means of the locking bolt 40.

A standard size end 41 is provided on the rod 27 in order that the usual ophthalmological instruments may be fitted and held in place by the set-screw 42.

On the lower sleeve 37 I have provided means whereby the whole middle structure may be moved longitudinally without the necessity of turning the pinion 35 with the handle 36. This alternative method forms a speedy means of positioning the instrument used for the examination either in a high position or low depending on the height of the patient. The novel means devised to accomplish this result is by providing a wedge-bar 43 in the lower sleeve 37 fitting into a tapered slot 44.

The wedge bar 43 is preferably formed slightly shorter in length than the tapered slot 44 in order that a clearance will be maintained at the lower end of the sleeve 37 which is covered by a flat plate 47 held in position by screws 48 as shown clearly in Fig. VII. This clearance will allow the wedge bar 43 to move longitudinally and in order to retain it closely against the standard 2 we have provided pressure by means of the spring 49 which enters the bar 43 for a short distance and rests against the plate 47 at the other end. Extra pressure is applied to the wedge bar 43 by a pair of side springs 60 which are located on each side of the spring 49 and function in a similar manner as the said spring 49. An elongated slot 46 aids in assembly.

Manual operation of the wedge bar 43 may be performed by means of the rocker 50 which is provided with a tongue 51 fitting into a related slot in the bar 43 and pivoted on the sleeve 37 with a pivot pin 52. When the wedge bar 43 is spring-pressed in position, the middle structure supported by the sleeve 37 will be movable upwardly only by means of the handle 36 actuating pinion 35.

The tapered wedge bar 43 will prevent the middle structure from falling downwardly or being moved downwardly by means of the rack and pinion gear.

When the rocker 50, however, is pushed upwardly the wedge bar 43 will move against the spring 49 and springs 60 sufficiently to release the friction on the standard 2 and allow the whole middle structure to drop downwardly without the necessity of manually operating the handle 36 and pinion 35. As soon as the pressure on the rocker 50 is released the springs 49 and 60 will actuate the wedge bar 43 to frictionally engage the standard 2 again.

It will be apparent from the foregoing description and operation that when the instrument being used for examination is supported on the end of the rod 27 and two patients in succession are a tall adult and small child a great reduction in the height of the instrument will be necessary.

It will also be apparent that this difference in height may be easily and quickly compensated for by means of the quick release wedge-bar structure. A slight pressure of the thumb will allow the instrument on the rod 27 to drop quickly to the desired height and be locked there when the thumb pressure is removed. The instrument may then be adjusted precisely to requirements by the handle and pinion mechanism as previously described.

The operation of the other moving parts such as the rod 27 which is movable longitudinally in the offset sleeve 24 is carried out by the rack and pinion means previously described. By releasing the clamping bolt 40 the rod may be moved longitudinally and by releasing the clamping bolt 26 it may be swung around the standard 2 to the desired angular position.

From the foregoing description it will become apparent that I have provided a diagnostic instrument stand, which incorporates adjusting means of an extremely simple nature and is also universally adjustable. The adjustability of the device may be accurately controlled and locked against untoward movement readily. The balance of the reciprocating parts is such that all quivering of the instrument will be eliminated and the examination may proceed under the most favorable circumstances.

If desired the base 1 may be removed and the stand itself placed in a convenient socket on the examining chair or auxiliary stand carrying other ophthalmological instruments. Much time will be saved in the positioning of the ophthalmological instrument before the patient's eyes so that a longer period may be spent on the examination itself. This feature will obviously make the novel and efficient means used of great benefit to the busy practitioner.

Having described my invention, I claim:

1. In a device of the character described, an inner member, a housing surrounding the inner member, means attached to the housing to secure said housing against movement in one direction on said inner member at any variable position on said inner member and operating independently of any definitely formed holding means on said inner member, means to move said housing and securing means in the opposite direction on the inner member to any variable position and means to disengage the securing means to permit movement of the securing means and housing in either direction.

2. In a device of the character described, an inner member, a housing surrounding the inner member, means attached to the housing to secure said housing against movement in a downward direction on said inner member at any variable position on said inner member and operating independently of any definitely formed holding means on said inner member, means to move said housing and securing means in an upward direction on the inner member to any variable position and means to disengage the securing means to permit movement of the securing means and housing in either direction.

3. In a device of the character described, an inner member, a housing surrounding the inner member, taper wedge means attached to the housing to secure said housing against movement in one direction on said inner member, means to move said housing and taper wedge in the opposite direction on the inner member and means to disengage the taper wedge to permit movement of the securing means and housing in either direction.

4. In a device of the character described, a support having guide means thereon, a sleeve on said support held against rotation by said guide means, a housing rotatable on the sleeve having an offset portion, means to secure said housing against rotation on the sleeve and means to secure said housing against longitudinal movement on said support.

5. In a device of the character described, a support having guide means thereon, a sleeve on said support held against rotation by said guide means, a housing rotatable on the sleeve having an offset portion, means to secure said housing and sleeve against movement in one direction on said support, means to move said sleeve, housing and securing means in the opposite direction on the support, and means to disengage the securing means to permit movement of the housing and sleeve in either direction.

6. In a device of the character described, an inner member having a housing thereon, a sleeve in said housing surrounding the inner member, means to secure said sleeve and housing against movement in a downward direction on said inner member, means to secure the housing against rotation on the sleeve, means to move said sleeve, housing and last named securing means in an upward direction on the inner member, means to disengage the last named securing means to permit rotation of the housing on the sleeve and means to disengage the first named securing means to permit movement of the sleeve and housing either downwards or upwards on the inner member.

7. In a device of the character described, an inner member, a housing surrounding the inner member, an offset portion on the housing having a bore lying substantially normal to the axis of the housing, a rod in the bore of the offset portion adapted to slide therein, means attached to the housing to secure said housing against movement in one direction on said inner member, means to move said housing and securing means in the opposite direction on said inner member to position the said rod at desired height and means to disengage the securing means to permit movement of the housing in either direction.

8. In a device of the character described, an inner member, a housing surrounding the inner member, an offset portion on the housing having a bore lying substantially normal to the axis of the housing, means to permit and prevent rotation of the housing on the inner member to position and lock said offset in desired angular position and means connected to the housing to permit and prevent movement of the housing downwardly and upwardly on the inner member to position and lock said offset at desired height.

9. In a device of the character described, an inner member, a housing surrounding the inner member, an offset portion on the housing having a bore lying substantially normal to the axis of the housing, a rod in the bore of the offset portion adapted to slide longitudinally therein, means to permit and prevent longitudinal movement of the rod in the bore to position and lock said rod in desired lateral position and means to permit and prevent rotation of the housing on the inner member to position and lock said offset in desired angular position.

10. In a device of the character described, an inner member, a housing surrounding the inner member, an offset portion on the housing having a bore lying substantially normal to the axis of the housing, a rod in the bore of the offset portion adapted to slide longitudinally therein, means to permit and prevent longitudinal movement of the rod in the bore to position and lock said rod in desired lateral position, means to permit and prevent rotation of the housing on the inner member to position and lock said offset in desired angular position and means connected to the housing to permit and prevent movement of the housing downwardly and upwardly on the inner member to position and lock said offset at a desired height.

11. In a device of the character described, a supporting member having a taper wedge thereon, an abutting member frictionally engaged by said wedge, means to disengage said wedge to allow movement of the supporting member downwardly and spring compression means to resiliently re-engage said wedge to allow movement of the supporting member upwardly.

12. In a device of the character described, a supporting member having a taper wedge thereon, an abutting member frictionally engaged by said wedge, a rocker pivoted on the supporting member and extending into the wedge to disengage said wedge to allow movement of the supporting member downwardly, compression means to re-engage said wedge to allow movement of the supporting member upwardly and rack and pinion means on the support and abutting member to perform said last named movement.

WILLIAM A. GUNNING.